US008386475B2

(12) United States Patent  
Green et al.

(10) Patent No.: US 8,386,475 B2  
(45) Date of Patent: *Feb. 26, 2013

(54) ATTRIBUTION ANALYSIS AND CORRELATION

(75) Inventors: Tammy Green, Provo, UT (US); Stephen R. Carter, Spanish Fork, UT (US); Scott Alan Isaacson, Kamuela, HI (US)

(73) Assignee: Novell, Inc., Provo, UT (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/346,665

(22) Filed: Dec. 30, 2008

(65) Prior Publication Data

US 2010/0169315 A1 Jul. 1, 2010

(51) Int. Cl.
*G06F 17/30* (2006.01)
(52) U.S. Cl. ............................................. 707/722
(58) Field of Classification Search ................ None
See application file for complete search history.

(56) References Cited

U.S. PATENT DOCUMENTS

| | | | |
|---|---|---|---|
| 5,276,677 A | 1/1994 | Ramamurthy et al. | |
| 5,278,980 A | 1/1994 | Pedersen et al. | |
| 5,317,507 A | 5/1994 | Gallant | |
| 5,325,298 A | 6/1994 | Gallant | |
| 5,325,444 A | 6/1994 | Cass et al. | |
| 5,390,281 A | 2/1995 | Luciw et al. | |
| 5,412,804 A | 5/1995 | Krishna | |
| 5,499,371 A | 3/1996 | Henninger et al. | |
| 5,524,065 A | 6/1996 | Yagasaki | |
| 5,539,841 A | 7/1996 | Huttenlocher et al. | |
| 5,551,049 A | 8/1996 | Kaplan et al. | |
| 5,619,709 A | 4/1997 | Caid et al. | |
| 5,675,819 A | 10/1997 | Schuetze | |
| 5,694,523 A | 12/1997 | Wical | |
| 5,696,962 A | 12/1997 | Kupiec | |
| 5,708,825 A | 1/1998 | Sotomayor | |
| 5,721,897 A | 2/1998 | Rubinstein | |
| 5,724,567 A * | 3/1998 | Rose et al. ........................... 1/1 |
| 5,768,578 A | 6/1998 | Kirk et al. | |
| 5,778,362 A | 7/1998 | Deerwester | |
| 5,778,378 A | 7/1998 | Rubin | |
| 5,778,397 A | 7/1998 | Kupiec et al. | |
| 5,794,178 A | 8/1998 | Caid et al. | |
| 5,799,276 A | 8/1998 | Komissarchik et al. | |
| 5,821,945 A | 10/1998 | Yeo et al. | |
| 5,822,731 A | 10/1998 | Schultz | |
| 5,832,470 A | 11/1998 | Morita et al. | |
| 5,867,799 A | 2/1999 | Lang et al. | |
| 5,873,056 A | 2/1999 | Liddy et al. | |
| 5,873,079 A | 2/1999 | Davis, III et al. | |
| 5,934,910 A | 8/1999 | Ho et al. | |

(Continued)

OTHER PUBLICATIONS

"CANDID Executive Summary"; Nov. 19, 1998; pp. 1-4.

(Continued)

*Primary Examiner* — Bai D. Vu
(74) *Attorney, Agent, or Firm* — Marger Johnson & McCollom, P.C.

(57) ABSTRACT

An attribution analysis and correlation system can include a content manager and a semantic correlation module. The content manager can receive a list identifying at least one contributor to be evaluated. The content manager can also mine at least one community for content pertaining to the contributor(s). The semantic correlation module can generate correlation results by performing a semantic analysis and correlation on the persistent content and attributions corresponding to the contributor(s).

17 Claims, 7 Drawing Sheets

U.S. PATENT DOCUMENTS

| | | | |
|---|---|---|---|
| 5,937,400 | A | 8/1999 | Au |
| 5,940,821 | A | 8/1999 | Wical |
| 5,963,965 | A | 10/1999 | Vogel |
| 5,966,686 | A | 10/1999 | Heidorn et al. |
| 5,970,490 | A | 10/1999 | Morgenstern |
| 5,974,412 | A | 10/1999 | Hazlehurst et al. |
| 5,991,713 | A | 11/1999 | Unger et al. |
| 5,991,756 | A | 11/1999 | Wu |
| 6,006,221 | A | 12/1999 | Liddy et al. |
| 6,009,418 | A | 12/1999 | Cooper |
| 6,015,044 | A | 1/2000 | Peterson |
| 6,041,311 | A | 3/2000 | Chislenko et al. |
| 6,076,088 | A | 6/2000 | Paik et al. |
| 6,078,953 | A | 6/2000 | Vaid et al. |
| 6,085,201 | A | 7/2000 | Tso |
| 6,097,697 | A | 8/2000 | Yao et al. |
| 6,105,044 | A | 8/2000 | DeRose et al. |
| 6,108,619 | A | 8/2000 | Carter et al. |
| 6,122,628 | A | 9/2000 | Castelli et al. |
| 6,134,532 | A | 10/2000 | Lazarus et al. |
| 6,141,010 | A | 10/2000 | Hoyle |
| 6,173,261 | B1 | 1/2001 | Arai et al. |
| 6,205,456 | B1 | 3/2001 | Nakao |
| 6,263,335 | B1 | 7/2001 | Paik et al. |
| 6,269,362 | B1 | 7/2001 | Broder et al. |
| 6,289,353 | B1 | 9/2001 | Hazlehurst et al. |
| 6,292,792 | B1 | 9/2001 | Baffes et al. |
| 6,295,092 | B1 | 9/2001 | Hullinger et al. |
| 6,295,533 | B2 | 9/2001 | Cohen |
| 6,297,824 | B1 | 10/2001 | Hearst et al. |
| 6,311,194 | B1 | 10/2001 | Sheth et al. |
| 6,317,708 | B1 | 11/2001 | Witbrock et al. |
| 6,317,709 | B1 | 11/2001 | Zack |
| 6,356,864 | B1 | 3/2002 | Foltz et al. |
| 6,363,378 | B1 | 3/2002 | Conklin et al. |
| 6,415,282 | B1 | 7/2002 | Mukherjea et al. |
| 6,446,061 | B1 | 9/2002 | Doerre et al. |
| 6,446,099 | B1 | 9/2002 | Peairs |
| 6,459,809 | B1 | 10/2002 | Jensen et al. |
| 6,460,034 | B1 | 10/2002 | Wical |
| 6,470,307 | B1 | 10/2002 | Turney |
| 6,493,663 | B1 | 12/2002 | Ueda |
| 6,513,031 | B1 | 1/2003 | Fries et al. |
| 6,523,026 | B1 | 2/2003 | Gillis |
| 6,606,620 | B1 | 8/2003 | Sundaresan et al. |
| 6,615,208 | B1 | 9/2003 | Behrens et al. |
| 6,615,209 | B1 | 9/2003 | Gomes et al. |
| 6,675,159 | B1 | 1/2004 | Lin et al. |
| 6,732,080 | B1 | 5/2004 | Blants |
| 6,754,873 | B1 | 6/2004 | Law et al. |
| 7,103,609 | B2 * | 9/2006 | Elder et al. ............ 1/1 |
| 7,117,198 | B1 | 10/2006 | Cronin et al. |
| 7,152,031 | B1 | 12/2006 | Jensen et al. |
| 7,197,451 | B1 * | 3/2007 | Carter et al. ............ 704/10 |
| 7,286,977 | B1 | 10/2007 | Carter et al. |
| 7,389,225 | B1 | 6/2008 | Jensen et al. |
| 7,401,087 | B2 | 7/2008 | Copperman et al. |
| 7,475,008 | B2 | 1/2009 | Jensen et al. |
| 7,562,011 | B2 | 7/2009 | Carter et al. |
| 7,949,728 | B2 | 5/2011 | Rivette et al. |
| 2002/0161747 | A1 | 10/2002 | Li et al. |
| 2002/0199166 | A1 | 12/2002 | Volcani et al. |
| 2003/0033301 | A1 * | 2/2003 | Cheng et al. ............ 707/6 |
| 2003/0217047 | A1 | 11/2003 | Marchisio |
| 2004/0122841 | A1 | 6/2004 | Goodman et al. |
| 2004/0254920 | A1 | 12/2004 | Brill et al. |
| 2005/0144162 | A1 | 6/2005 | Liang |
| 2006/0020593 | A1 * | 1/2006 | Ramsaier et al. ............ 707/5 |
| 2006/0200556 | A1 | 9/2006 | Brave et al. |
| 2006/0287898 | A1 | 12/2006 | Murashita et al. |
| 2007/0061301 | A1 | 3/2007 | Ramer et al. |
| 2007/0094031 | A1 * | 4/2007 | Chen ............ 704/267 |
| 2007/0106491 | A1 | 5/2007 | Carter et al. |
| 2007/0106651 | A1 * | 5/2007 | Isaacson et al. ............ 707/3 |
| 2007/0233671 | A1 * | 10/2007 | Oztekin et al. ............ 707/5 |
| 2008/0027924 | A1 | 1/2008 | Hamilton et al. |
| 2008/0126172 | A1 | 5/2008 | Melamed et al. |
| 2008/0222574 | A1 | 9/2008 | Coyne |
| 2008/0235189 | A1 | 9/2008 | Rayman et al. |
| 2008/0235220 | A1 | 9/2008 | Chen et al. |
| 2008/0309677 | A1 | 12/2008 | Fleury et al. |
| 2008/0316227 | A1 | 12/2008 | Fleury et al. |
| 2009/0063467 | A1 | 3/2009 | Abhyanker |
| 2010/0082660 | A1 | 4/2010 | Muilenburg et al. |
| 2010/0274815 | A1 | 10/2010 | Vanasco |

OTHER PUBLICATIONS

"Methodology"; 1997; pp. 1-5.

"Platform for Internet Content Selection (PICS)" htto://www.w3.org; 1997-2003; pp. 1-8.

"WordNet—a lexical database for the English language"; Cognitive Science Laboratory, Princeton University, www.cogsci.princeton.edu; printed on Nov. 5, 2004; 2 pages.

Bartell et al., "Latent Semantic Indexing is an Optimal Special Case of Multidimensional Scaling"; Dept. of Computer Science & Engineering; University of California, San Diego; 1992; 7 pages.

Chakrabarti, Soumen, Dom, Byron, Kumar, S. Ravi, Raghavan, Prabhakar, Rajagopalan, Sridhar, and Tomkins, Andrew, "Hypersearching the Web"; Scientific American, Jun. 1999; pp. 54-60.

Chomsky, Noam, "Language and Thought"; 1993; pp. 18-19, 22-27, 44-45, 60-61.

Chomsky, Noam, "The Minimalist Program"; 1995; pp. 13-127.

Chu et al., "Knowledge-Based image retrieval with spatial and temporal constructs"; IEEE; Nov. 1998; pp. 872-888.

Cook, Vivian and Newson, Mark, "Chomsky's Universal Grammar—An Introduction"; 1988; pp. 40-74, 131-272.

Culler, Jonathan, "Ferdinand de Saussure—Revised Edition"; 1986; pp. 38-57.

Deng, "Ne Tra-V: Toward an object based video representation"; IEEE; Sep. 1998; pp. 612-627.

Eco, Umberto, "Semiotics and the Philosophy of Language"; 1984; pp. 46-86.

Eco, Umberto, Santambrogio, Marco, and Violi, Patrizia (editors), "Meaning and Mental Representations"; 1988; p. 221.

Edwards R. E., "Functional Analysis: Theory and Applications"; 1965; pp. 10-13, 32-33, 50-53, 62-65, 88-103, 174-203, 224-233.

EPIC Report, "Faulty Filters: How content filters block access to kid-friendly information on the internet"; 1997; pp. 1-8.

Faudemay et al., "Intelligent delivery of personalized video programmes from a video database"; IEEE; 1997; pp. 172-177.

Geiger et al., "Dynamic programming for detecting, tracking, and matching deformable contours"; 1995; pp. 294-302.

Gudivada et al., "Design and evaluation of algorithms for image retrieval by spatial similarity"; 1995; pp. 116-144.

Halmos, Paul R., "Naïve Set Theory"; Undergraduate Texts in Mathematics, Litton Educational Publishing; 1960; Springer-Verlag, New York, NY; 1974; pp. 56-57, 66-69.

Han et al., "Image organization and retrieval with automatically constructed feature vectors"; 1996.

Hocking, John G. and Young, Gail S., "Topology"; 1961; pp. 6-7, 56-59, 68-71.

Hsu et al., "A Knowledge-Based Approach for retrieving images by content", IEEE; Aug. 1996; pp. 522-532.

Hutson, V. and Pym, J.S., "Applications of Functional Analysis and Operator Theory"; 1980; index, preface, and Table of Contents.

Jain et al., "Object matching using deformable templates"; IEEE; 1996; pp. 267-278.

Kahn, Donald W., "Topology: An Introduction to the Point-Set and Algebraic Areas"; 1975; pp. 10-15.

Khare, Rohit and Rifkin, Adam, "Capturing the State of Distributed Systems with XML"; Oct. 26, 1997; pp. 1-12.

Kupeev et al., "On shape similarity"; IEEE; 1994; pp. 227-231.

Liu et al., "Partial shape classification using contour matching in distance transformation"; IEEE; Nov. 1990; pp. 1072-1080.

Lundquist, Carol, Grossman, David A., and Frieder, Ophir, "Improving Relevance Feedback in the Vector Space Model"; 1997; ACM 0-89791-970-X; pp. 16-23.

Mahesh, "Ontology Development for Machine Translation: Ideology and Method"; Computing Research Laboratory, New Mexico State University; 1996; 1-79.

Mehrotra et al., "Feature based retrieval of similar shapes"; IEEE; 1993; pp. 108-115.
Mehrotra et al., "Similar-shape retrieval in shape data management"; IEEE; 1995; pp. 57-62.
Meier et al., "Segmentation and tracking of moving objects for content-based video coding"; IEEE; Jun. 1999; pp. 144-150.
Mostafa et al., "A Multilevel Approach to Intelligent Information Filtering: Model. System, and Evaluation"; ACM Transactions on Information Systems, vol. 15, No. 4; Oct. 1997; pp. 368-399.
Nes et al., "Region-based indexing in an image database"; 1997; pp. 1-9.
Onyshkevych, B. et al., "A Lexicon for Knowledge-Based MT"; Machine Translation; 1995; pp. 1-49.
Ozer et al., "A graph based object description for information retrieval in digital image and video libraries"; IEEE; Jun. 22, 1999; pp. 1-4.
Pejtersen, Annelise Mark, "Semantic Information Retrieval"; Communications of the ACM, vol. 41, No. 5; Apr. 1998; pp. 90-92.
Pesetsky, David, "Zero Syntax Experiencers and Cascades"; 1995; pp. 1-122.
Ravela et al., "Retrieving images by similarity of visual appearance"; IEEE; 1997; pp. 67-74.
Saber et al., "Integration of color, shape and texture for image annotation and retrieval"; IEEE; 1996; pp. 851-854.
Singh, "Unifying Heterogeneous Information Models"; Tesserae Information Systems, Inc., http://citeseer.ist.psu.edu.com; printed on Nov. 5, 2004; pp. 1-13.
Smith et al., "Searching for images and videos on the world-wide web"; 1996; pp. 1-17.
Smith, George W., "Computers and Human Language"; 1991; pp. 205-257.
Vapillon et al., "Analyzing and filtering contour deformation"; IEEE; 1998; pp. 267-271.
Wired News, "SurfWatch Allowed Key Patent"; Nov. 16, 1998, pp. 1-3.
Yang et al., "A similarity measure of deformable shapes"; IEEE; 1997; pp. 1455-1459.
Aman et al., "Identifying Expressions of Emotion in Text", TSD 2007, LNAI 4629, pp. 196-205.
Neviarouskaya et al., "Narrowing the Social Gap among People Invoiced in Global Dialogue: Automatic Emotion Detection in Blog Posts", ICWSM, 2007 (2 pages).
Schneier, B., "Anonymity and the Netflix Database", retrieved from http://www.schneier.com/blog/archives/2007/12; Dec. 18, 2007 (2 pages).
Schneier, B., "Why Anonymous Data Sometimes Isn't", retrieved from http://www.wired.com/politics/security/commentary/securitymatters/2007/12/securitymatters_1213; Dec. 13, 2007 (3 pages).
"Intelligent Collaboration & Visualization"; pp. 1-16, retrieved on Apr. 17, 2009.
"Intelligent Collaboration & Visualization"; pp. 1-16, retrieved Apr. 2009.

* cited by examiner

ATTRIBUTION ANALYSIS AND CORRELATION

CROSS-REFERENCE TO RELATED APPLICATIONS

This application is related to co-pending and commonly owned U.S. patent application Ser. No. 11/929,678, titled "CONSTRUCTION, MANIPULATION, AND COMPARISON OF A MULTI-DIMENSIONAL SEMANTIC SPACE," filed on Oct. 30, 2007, which is a divisional of U.S. patent application Ser. No. 11/562,337, filed on Nov. 21, 2006, which is a continuation of U.S. patent application Ser. No. 09/512,963, filed Feb. 25, 2000, now U.S. Pat. No. 7,152,031, issued on Dec. 19, 2006. All of the foregoing applications are fully incorporated by reference herein.

This application is also related to co-pending and commonly owned U.S. patent application Ser. No. 11/616,154, titled "SYSTEM AND METHOD OF SEMANTIC CORRELATION OF RICH CONTENT," filed on Dec. 26,2006, which is a continuation-in-part of U.S. patent application Ser. No. 11/563,659, titled "METHOD AND MECHANISM FOR THE CREATION, MAINTENANCE, AND COMPARISON OF SEMANTIC ABSTRACTS," filed on Nov. 27,2006, which is a continuation of U.S. patent application Ser. No. 09/615,726, filed on Jul. 13, 2000, now U.S. Pat. No. 7,197,451, issued on Mar. 27, 2007; and is a continuation-in-part of U.S. patent application Ser. No. 11/468,684, titled "WEB-ENHANCED TELEVISION EXPERIENCE," filed on Aug. 30,2006; and is a continuation-in-part of U.S. patent application Ser. No. 09/691,629, titled "METHOD AND MECHANISM FOR SUPERPOSITIONING STATE VECTORS IN A SEMANTIC ABSTRACT," filed on Oct. 18, 2000, now U.S. Pat. No. 7,389,225, issued on Jun. 17, 2008; and is a continuation-in-part of U.S. patent application Ser. No. 11/554,476, titled "INTENTIONAL-STANCE CHARACTERIZATION OF A GENERAL CONTENT STREAM OR REPOSITORY," filed on Oct. 30, 2006, which is a continuation of U.S. patent application Ser. No. 09/653,713, filed on Sep. 5, 2000, now U.S. Pat. No. 7,286,977, issued on Oct. 23, 2007. All of the foregoing applications are fully incorporated by reference herein.

This application is also related to co-pending and commonly owned U.S. patent application Ser. No. 09/710,027, titled "DIRECTED SEMANTIC DOCUMENT PEDIGREE," filed on Nov. 7, 2000, which is filly incorporated by reference herein.

This application is also related to co-pending and commonly owned U.S. patent application Ser. No. 11/638,121, titled "POLICY ENFORCEMENT VIA ATTESTATIONS," filed on Dec. 13, 2006, which is a continuation-in-part of U.S. patent application Ser. No. 11/225,993, titled "CRAFTED IDENTITIES," filed on Sep. 14, 2005, and is a continuation-in-part of U.S. patent application Ser. No. 11/225,994, titled "ATTESTED IDENTITIES," filed on Sep. 14, 2005. All of the foregoing applications are fully incorporated by reference herein.

This application is also related to and fully incorporates by reference the following co-pending and commonly owned patent applications: U.S. patent application Ser. No. 12/267,279, titled "PREDICTIVE SERVICE SYSTEMS," filed on Nov. 7, 2008; U.S. patent application Ser. No. 12/346,657, titled "IDENTITY ANALYSIS AND CORRELATION," filed on Dec. 30, 2008; and U.S. patent application Ser. No. 12/346,662, titled "CONTENT ANALYSIS AND CORRELATION," filed on Dec. 30, 2008.

This application also fully incorporates by reference the following commonly owned patents: U.S. Pat. No. 6,108,619, titled "METHOD AND APPARATUS FOR SEMANTIC CHARACTERIZATION OF GENERAL CONTENT STREAMS AND REPOSITORIES," U.S. Pat. No. 7,177,922, titled "POLICY ENFORCEMENT USING THE SEMANTIC CHARACTERIZATION OF TRAFFIC," and U.S. Pat. No. 6,650,777, titled "SEARCHING AND FILTERING CONTENT STREAMS USING CONTOUR TRANSFORMATIONS," which is a divisional of U.S. Pat. No. 6,459,809.

TECHNICAL FIELD

The disclosed technology pertains to systems and methods for analyzing and correlating attributions.

BACKGROUND

As the amount of collaboration taking place on the Internet continues to rise, it becomes increasingly difficult but more important to be confident that the author of a particular submission is the actual author and not somebody else. It is also important to be able to identify situations in which two separate contributors are actually the same person.

Currently, search engines typically allow searches concerning a particular subject. However, such search engines allow for neither correlation of results over the results of several engines nor correlation of results over time. Some research projects involving correlations between content authored in multiple venues have been conducted, such as a University of Texas study that attempted to correlate Netflix users with IMDb review contributors in an attempt to de-anonymize the users. However, such correlation engines are not available for general purpose use on a data set of a user's choosing. Also, they do not provide the kind of results that would be easy for a novice user to understand.

SUMMARY

An example of an attribution analysis and correlation system can include multiple communities, a content manager, persistent content, attributions, a semantic correlation module, and correlation results. For example, the content manager can receive as input a list of contributors, mine the communities for content pertaining to the contributors, and output the results into the persistent content. The semantic correlation module can then perform a semantic analysis on the persistent content and the pertinent attributions to generate the correlation results.

Embodiments of the disclosed technology can advantageously provide methods and systems for determining differences or similarities between two or more different attributions and/or contributors. For example, such methods and systems can include semantic analysis and correlation to determine whether certain content was authored by a particular contributor or whether two different contributors are actually the same person.

Embodiments of the disclosed technology can advantageously provide methods and systems for determining whether the authorship of a particular submission has changed. Embodiments of the disclosed technology can also provide methods and systems for tracking of contributor stability.

The foregoing and other features, objects, and advantages of the invention will become more readily apparent from the

DETAILED DESCRIPTION

Embodiments of the disclosed technology, such as the exemplary embodiments described below, can advantageously provide methods and systems for determining differences or similarities between attributions from multiple contributors. Such embodiments can assist a user in identifying a certain contributor and/or determining whether authorship of a particular submission has changed, for example.

Exemplary Contributors, Attributions, and Communities

As used herein, a contributor or collaborator generally refers to a user that provides online content (e.g., online contributions such as posted information). For example, a contributor can include a user that authors and posts submissions (e.g., documents, articles, blog entries, or other information) to an online community as part of a collaboration. As used herein, contributions (e.g., online contributions) that are each attributed to a particular contributor (e.g., user or persona) will generally be referred to as attributions.

A contributor or collaborator can refer to a particular user or to a particular user's persona (e.g., a generated identity that can allow the true identity of the user to remain anonymous). Thus, a single user can be credited as multiple contributors if he or she uses or has used multiple personas, each of which constitutes or constituted a separate contributor.

As used herein, communities generally refer to online user groups or collaborations. A user can provide links of his or her membership or association with one or more communities. The user can also provide summaries of his or her membership in a particular community (e.g., using a persona). In general, a user can be a member of many different communities. A user can also have multiple personas that all belong to the same community.

In general, for any given community, a member user can provide a statement of intent describing why the user (or one or more of the user's pertinent personas) is a member of the community and what the user hopes to gain by his or her membership in the community. In certain embodiments, such a statement of intent is withheld (e.g., not shared) with the rest of the community. Other information concerning the user's (or persona's) membership in the community can also be withheld from the community.

In certain embodiments of the disclosed technology, the membership information of a particular user (or one or more of the user's personas) for a certain community is not known (e.g., not public) but can be derived (e.g., in an ad hoc manner) via analysis of the community content.

Exemplary Attribution Analysis and Correlation System

Figure 1:
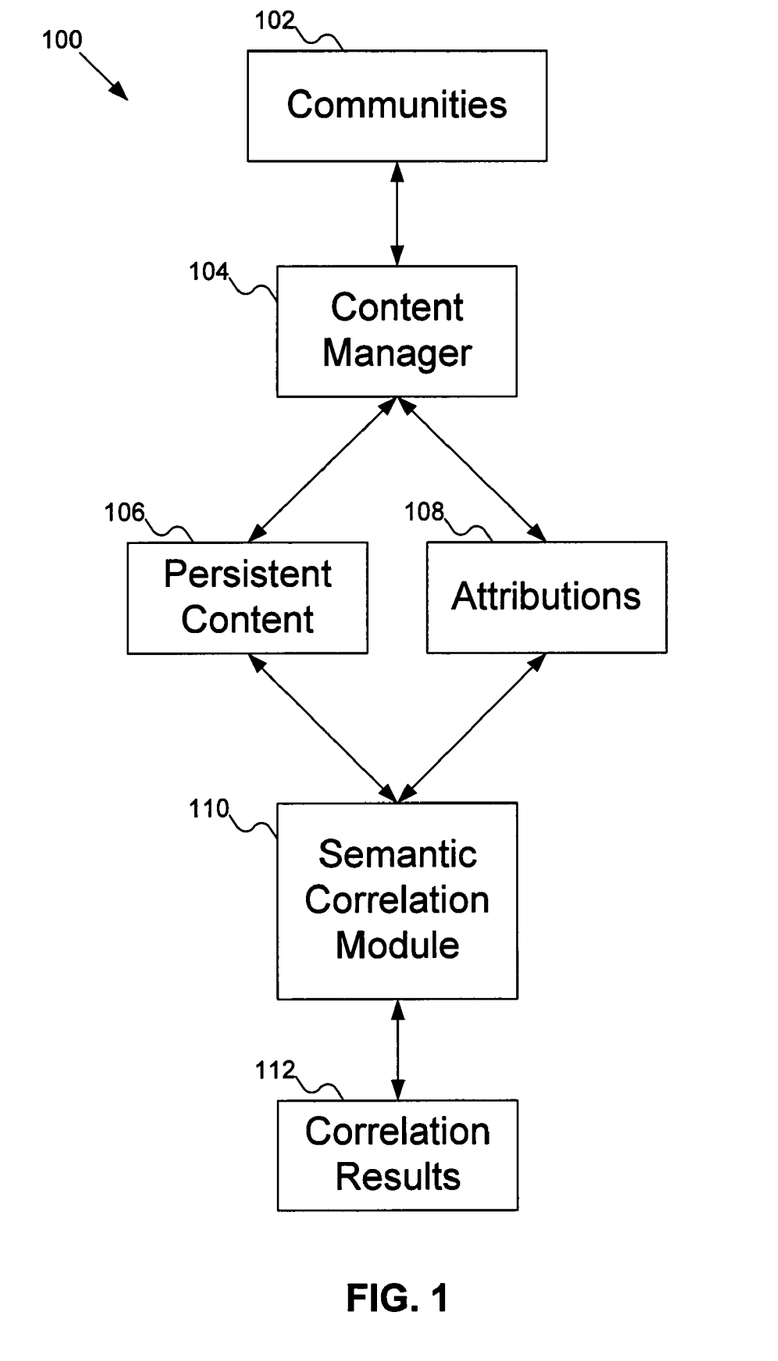
FIG. 1 shows an example of an attribution analysis and correlation system in accordance with embodiments of the disclosed technology.

FIG. 1 shows an example of an attribution analysis and correlation system 100 in accordance with embodiments of the disclosed technology. In the example, the attribution analysis and correlation system 100 includes communities 102, a content manager 104, persistent content 106, attributions 108, a semantic correlation module 110, and correlation results 112. One having ordinary skill in the art will appreciate that various aspects of the attribution analysis and correlation system 100 can be implemented in a tangible, machine-readable medium, for example, such as computer-readable media storing computer-executable instructions that, when executed by a processor, perform computer-implemented methods such as those described herein.

A user can provide a list of contributors (e.g., personas) that the user wishes to evaluate. For example, if the user wishes to determine a measure of similarity or difference between contributor A and contributor B, the user would provide a list including contributors A and B. Alternatively, the list can consist of a single contributor in the event that the user is curious as to the likelihood that the contributor is no longer than the same person, for example.

Based on the list provided by the user, the content manager 104 can retrieve all pertinent attributions (e.g., contributions attributed respectively to contributors A and B) from the attributions 108. Based on the attributions retrieved from the attributions 108, the content manager 104 can mine (e.g., search) the communities 102 for content pertaining to (e.g., referencing, related to, and/or containing) any of the pertinent attributions.

The content manager 104 can save the results of the mining in the persistent content 106. For example, persistent links to the mined content can be saved in the persistent content 106. Alternatively (in situations where network links are not persistent, for example), a copy of the content itself can be saved in the persistent content 106.

Based on the persistent content 106 (and, in certain embodiments, the attributions 108), the semantic correlation module 110 can perform at least one type of semantic analysis (e.g., semantic and/or writing style correlation) on contributors A and B. The semantic correlation module 110 can produce as output correlation results 112, which can provide information pertaining to similarities and/or differences between contributors A and B.

The correlation results 112 can be stored (e.g., in local memory or in a database) and/or outputted to a display. In certain embodiments, a dashboard utility (not shown) can be used to provide a graphical representation of information pertaining to one or more of the correlation results 112.

Exemplary Content Management Service

Figure 2:
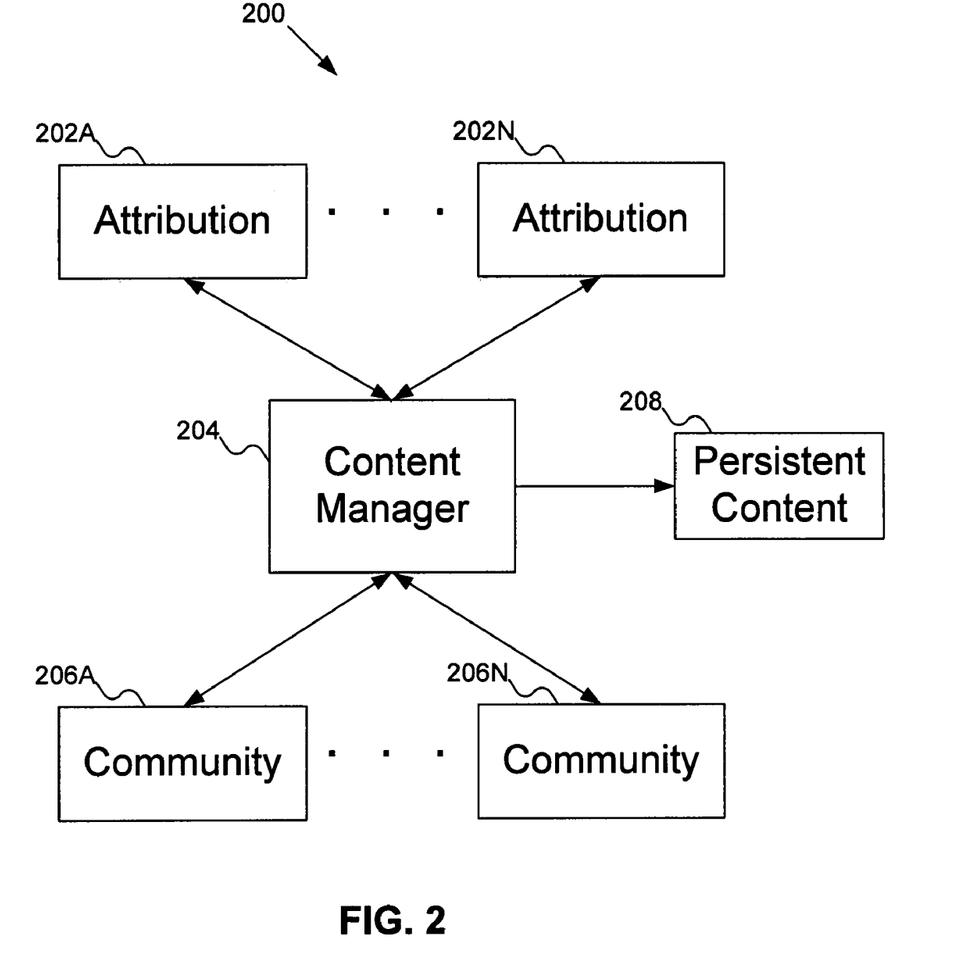
FIG. 2 shows an example of a content management service in accordance with embodiments of the disclosed technology.

FIG. 2 shows an example of a content management service 200 in accordance with embodiments of the disclosed technology. In the example, the content management service 200 includes attributions 202A-202N, a content manager 204, communities 206A-206N, and persistent content 208. One having ordinary skill in the art will appreciate that various aspects of the content management service 200 can be implemented in a tangible, machine-readable medium, for example.

In certain embodiments, a user can generate a list of contributors from one or more of the communities 206A-206N for evaluation. For example, during the course of a particular collaboration, the user may desire to ascertain the probability of pertinent attributions (e.g., contributions attributed to certain contributors) being the same or different. Thus, the user can provide to the content manager 204 search criteria that can include an intent declaration. The search criteria provided by the user can be saved for future reuse and can also be combined with other saved search criteria, for example.

The content manager 204 can mine (e.g., search) one or more of the communities 206A-206N for pertinent attributions 202A-202N. In certain embodiments, the content manager 204 can use one or more search engines that can include commonly available search engines such as Yahoo! or Google, for example, to search public content. The content manager 204 can also use private search engines that can access both public and private content.

The content manager 204 can provide as output results of the search (e.g., mined content), which can be advantageously stored as persistent content 208. The persistent content 208 can include links (e.g., persistent links) to the mined content. Alternatively (such as in situations where network links are not persistent, for example), a copy of the mined content itself can be stored in the persistent content 208.

In certain embodiments, a user can specify that all members of a community are to be evaluated. While such embodiments typically involve a greater resource requirement that those involving a simple declared list, the identity or identities of some or all members of the community can be advantageously derived by way of attribution analysis and correlation rather than relying on community registration records, which are often known to contain mistaken or possibly even fraudulent information.

Exemplary Semantic Correlation Service

Figure 3:
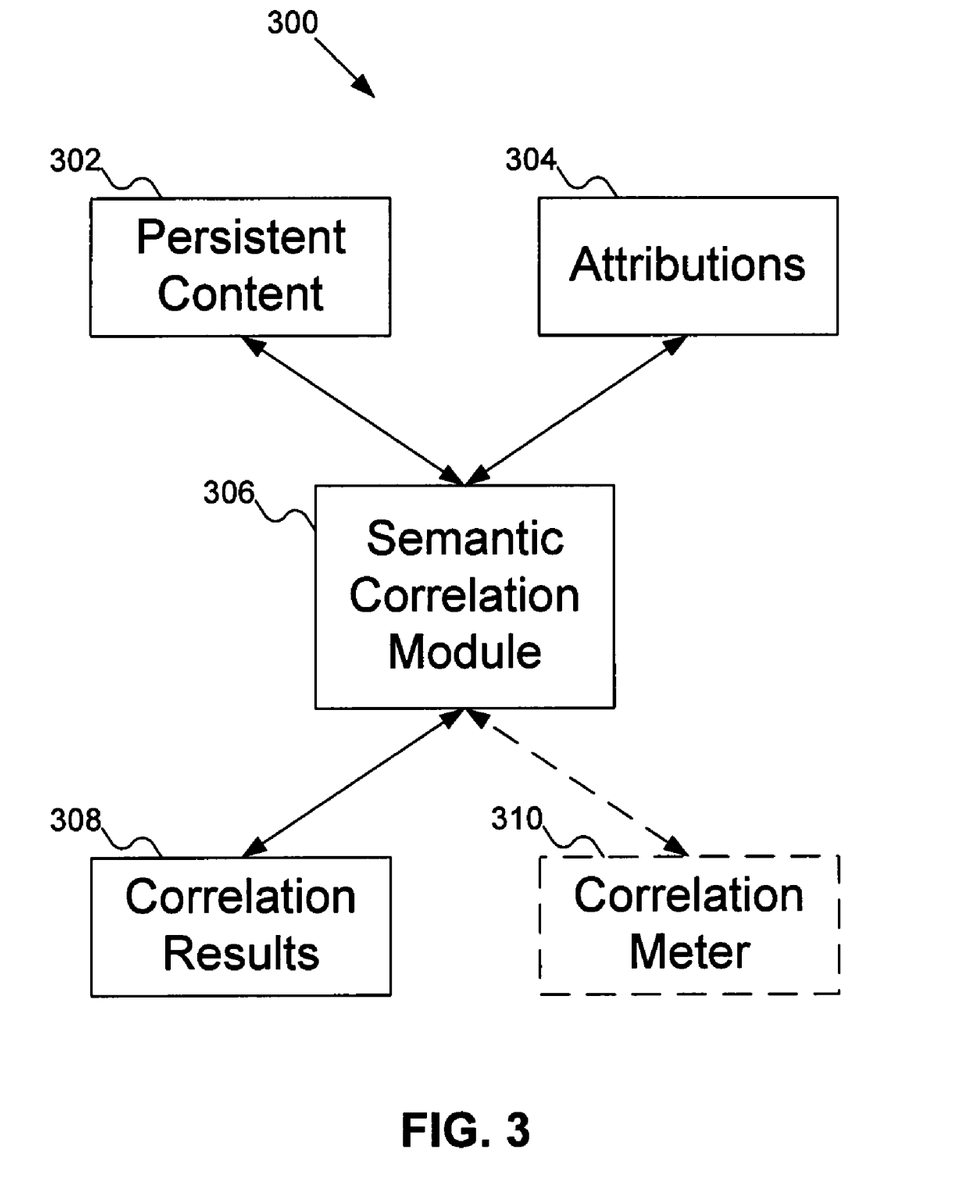
FIG. 3 shows an example of a semantic analysis service in accordance with embodiments of the disclosed technology.

FIG. 3 shows an example of a semantic correlation service 300 in accordance with embodiments of the disclosed technology. In the example, the semantic correlation service 300 includes persistent content 302, attributions 304, a semantic correlation module 306, and correlation results 308. One having ordinary skill in the art will appreciate that various aspects of the semantic correlation service 300 can be implemented in a tangible, machine-readable medium, for example.

In the example, the semantic correlation module 306 can evaluate (e.g., analyze and correlate) the persistent content 302 and pertinent attributions 304 and, based on the evaluating, generate the correlation results 308. The semantic correlation module 306 can utilize one or more of several different types of analysis and correlation mechanisms (e.g., semantic and/or writing style correlation) by comparing attributions of each of the contributors to be evaluated, for example. As part of the evaluation, the semantic correlation module 306 may construct and/or compare multiple semantic abstracts based on the persistent content 302 (and, in some cases, the attributions 304), for example.

Intermediate results of the semantic correlation module 306 can be advantageously saved (not shown) so that future requests can use already completed analysis and correlation, for example.

In certain embodiments, the semantic correlation module 306 can evaluate suspect content on a timeline to determine whether a change in authorship occurred at a specific time or date (or within a certain date/time range). The semantic correlation module 306 can use public information concerning a contributor to verify timeline information.

Consider an example in which a user wishes to determine the likelihood of a certain contributor being the author of a particular content that was just published (e.g., submitted). In the example, the contributor has published his or her calendar, which indicates that he or she is currently on vacation. If the semantic correlation module 306 determines that the contributor in question has never published content while on previous vacations, then the semantic correlation module 306 may determine a low probability that the particular content was authored by the suspect contributor. One having ordinary skill in the art will appreciate that this is but one of the many types of analysis the semantic correlation module 306 can perform as part of the evaluation process.

Consider another example in which the suspect contributor is known to be presently ill or undergoing surgery. In the example, the semantic correlation module 306 may determine, based on the illness or surgery, a low probability that the suspect contributor is the author of certain recently-published content. Again, one having ordinary skill in the art will appreciate that this is but one of the many types of analysis the semantic correlation module 306 can perform as part of the evaluation process.

In situations where a user may suspect that a particular authorship has changed, the user can identify the single contributor to a content manager, for example. Based on results of content mining within one or more communities by the content manager, the semantic correlation module 306 can perform semantic analysis and correlation on the mined content (e.g., on a timeline basis) to determine a likelihood as to whether the suspect authorship has indeed changed along the way.

Figure 4:
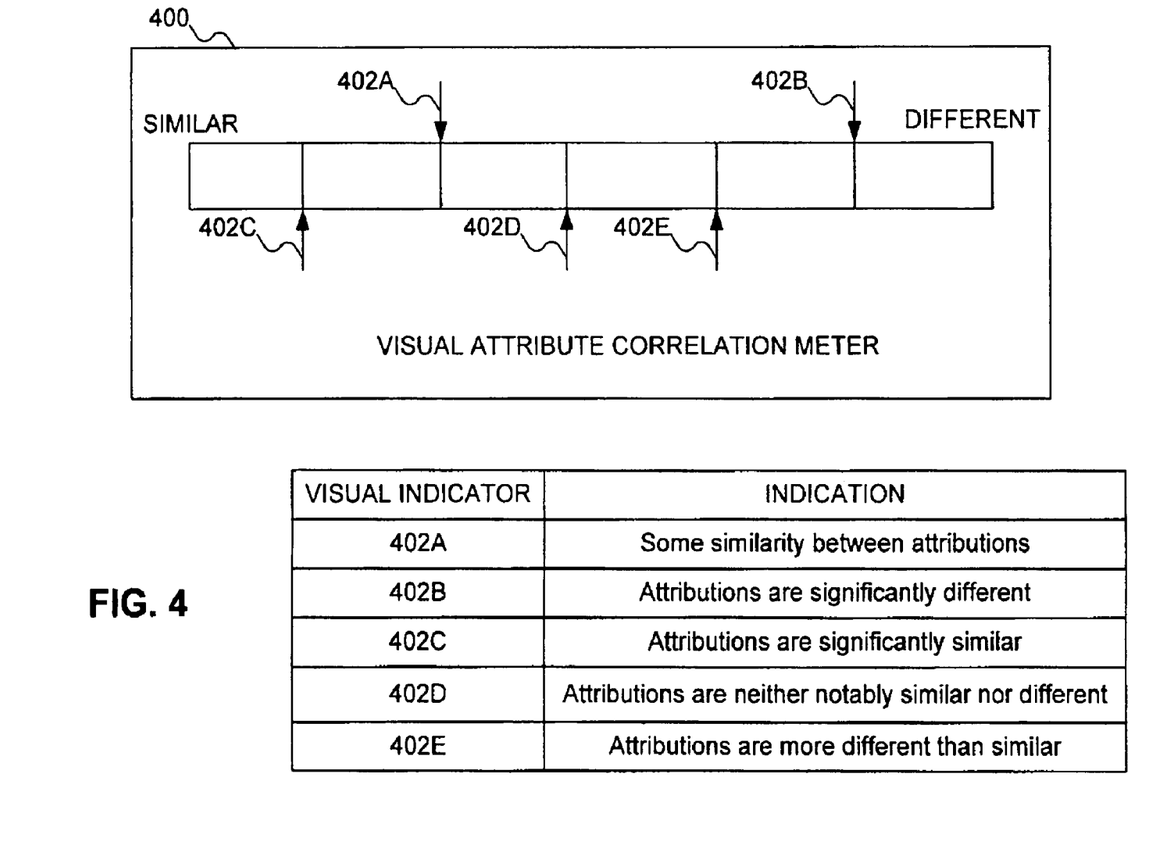
FIG. 4 shows an example of a dashboard utility in accordance with embodiments of the disclosed technology.

In certain embodiments, a dashboard utility (e.g., a correlation meter 310) can be used to provide a graphical representation of certain information pertaining to the correlation results 308. FIG. 4 illustrates an example of such a dashboard by showing a correlation meter 400. Status arrows 402A through 402N can be used to provide a graphical representation showing a measure of the similarity (or difference) between two different attributions and thereby indicate the likelihood that two different contributors are in fact the same person, for example.

Exemplary Method of Constructing a Semantic Abstract

Figure 5:
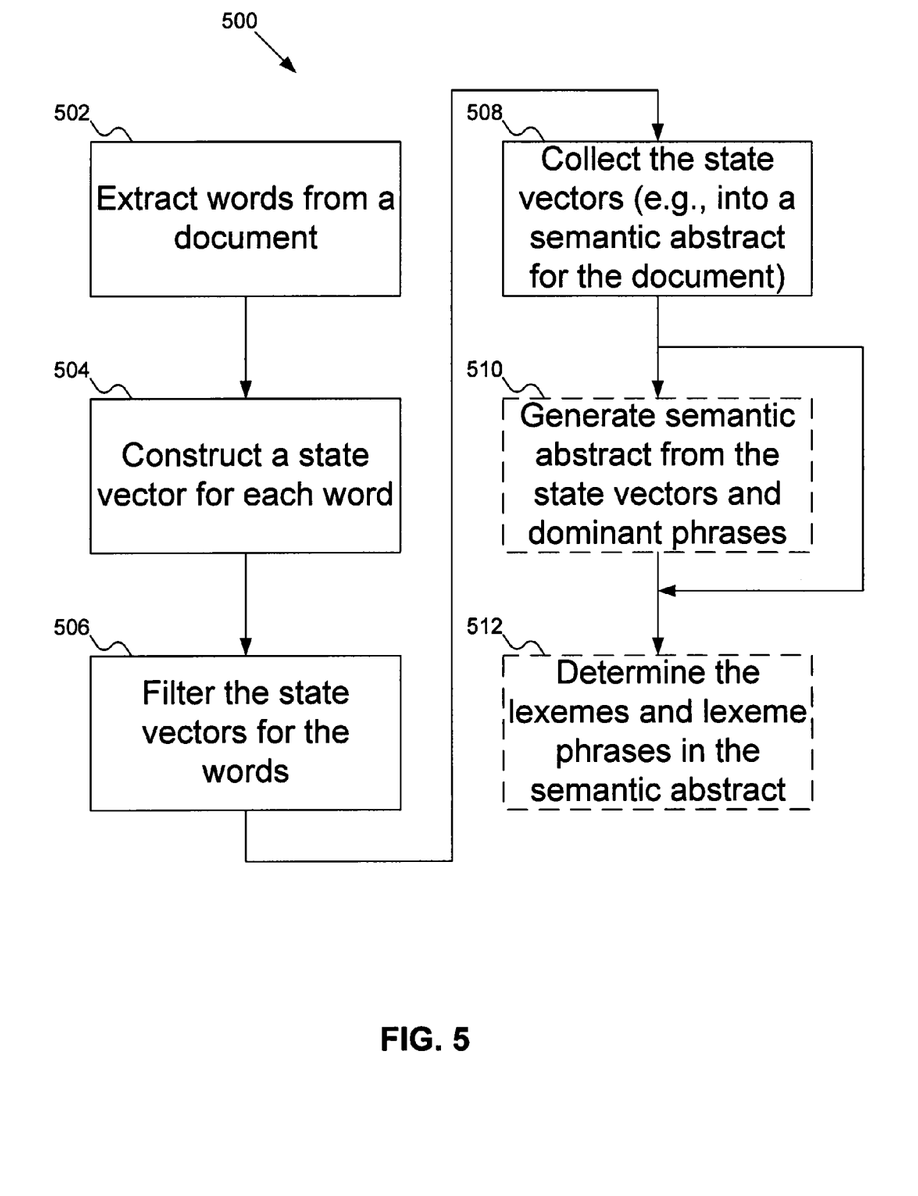
FIG. 5 shows a flowchart illustrating an example of a method of constructing a semantic abstract for a document based on dominant vectors.

FIG. 5 shows a flowchart illustrating an example of a method 500 of constructing a semantic abstract for a document based on dominant vectors. At 502, words are extracted from the document. The words can be extracted from the entire document or from only portions of the document (such as one of the abstracts of the document or the topic sentences of the document, for example). At 504, a state vector is constructed for each word extracted from the document. At 506, the state vectors are filtered to reduce the size of the resulting set, producing the dominant vectors. Finally, at 508, the filtered state vectors are collected into a semantic abstract for the document.

The dominant vectors and the dominant phrase vectors can be generated at any time before the semantic abstract is created. Once the dominant vectors and dominant phrase vectors are created, the original document is not necessarily required to construct the semantic abstract.

FIG. 5 shows two additional steps that are also possible in the example. At 510, the semantic abstract is generated from both the dominant vectors and the dominant phrase vectors. The semantic abstract can be generated by filtering the dominant vectors based on the dominant phrase vectors, by filtering the dominant phrase vectors based on the dominant vectors, or by combining the dominant vectors and the dominant phrase vectors in some way, for example. Finally, at 512, the lexeme and lexeme phrases corresponding to the state vectors in the semantic abstract are determined.

Exemplary Method of Comparing Two Semantic Abstracts

Figure 6:
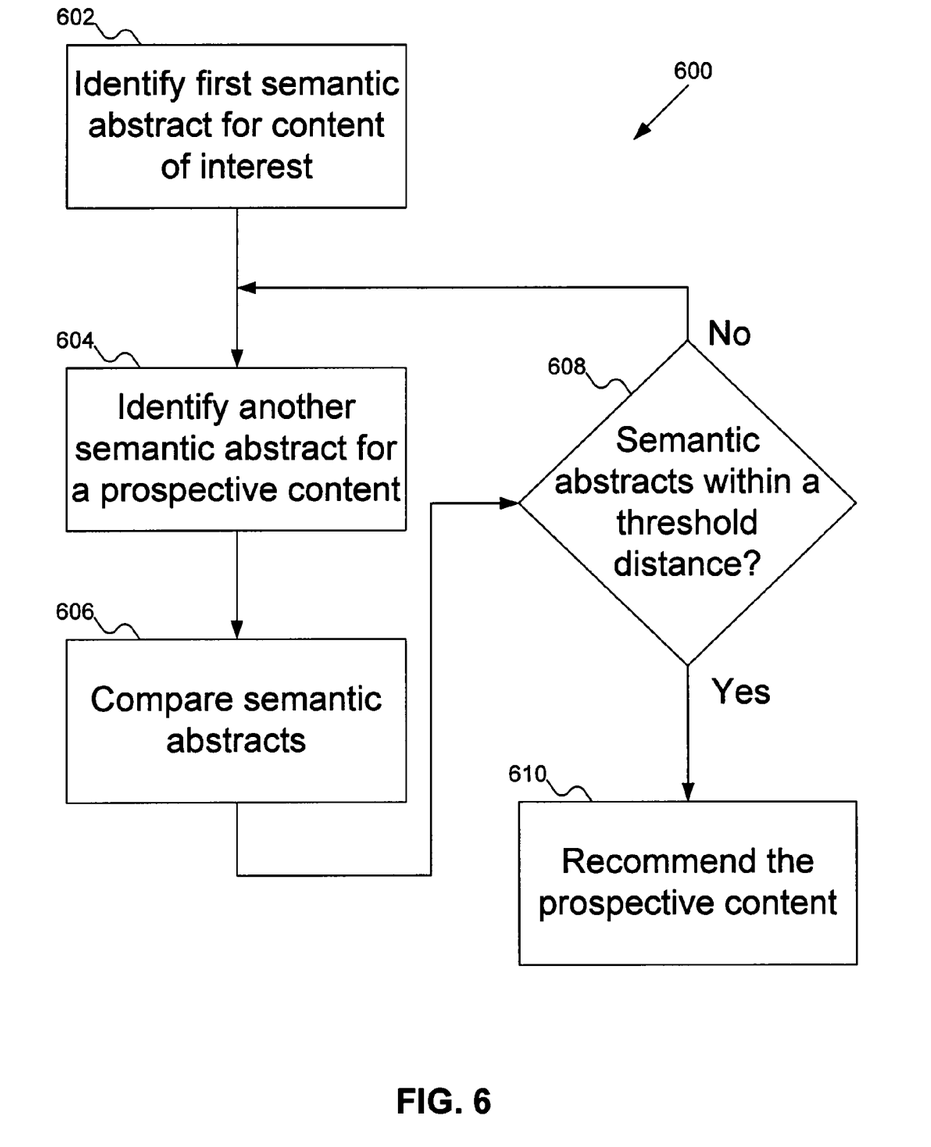
FIG. 6 shows a flowchart illustrating an example of a method of comparing two semantic abstracts and recommending a second content that is semantically similar to a content of interest.

FIG. 6 shows a flowchart illustrating an example of a method 600 of comparing two semantic abstracts and recommending a second content that is semantically similar to a content of interest. At 602, a semantic abstract for a content of interest is identified. At 604, another semantic abstract representing a prospective content is identified. In either or both 602 and 604, identifying the semantic abstract can include generating the semantic abstracts from the content, if appropriate. At 606, the semantic abstracts are compared. Next, a determination is made as to whether the semantic abstracts are "close," as shown at 608. In the example, a threshold distance is used to determine if the semantic abstracts are "close." However, one having ordinary skill in the art will recognize that there are various other ways in which two semantic abstracts can be deemed "close."

If the semantic abstracts are within the threshold distance, then the second content is recommended to the user on the basis of being semantically similar to the first content of interest, as shown at 610. If the other semantic abstracts is not within the threshold distance of the first semantic abstract, however, then the process returns to step 604, where yet another semantic abstract is identified for another prospective content. Alternatively, if no other content can be located that is "close" to the content of interest, processing can end.

Figure 7:
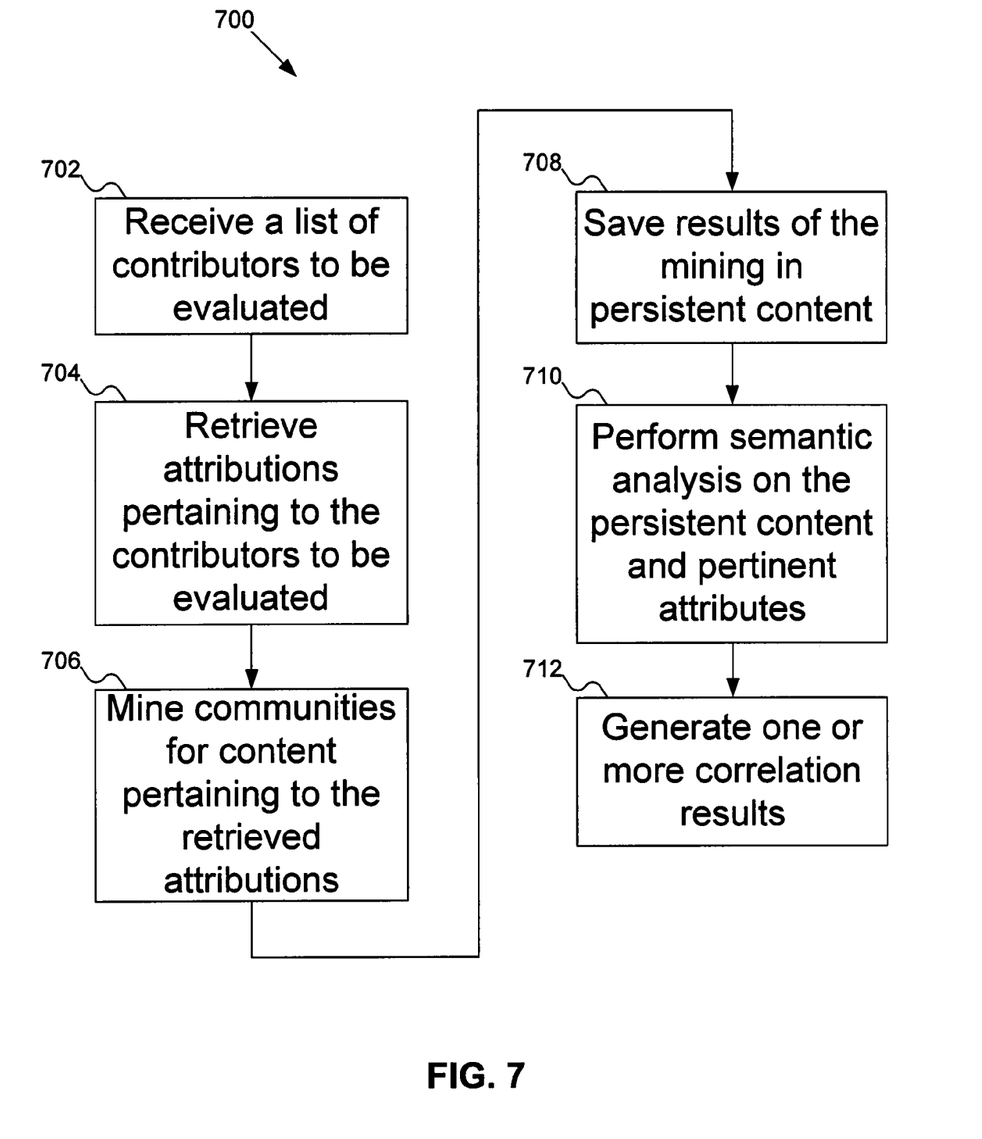
FIG. 7 shows an example of a method of attribution analysis and correlation in accordance with embodiments of the disclosed technology.

Exemplary Method of Attribution Analysis and Correlation in Accordance with Implementations of the Disclosed Technology FIG. 7 shows an example of a method of attribution analysis and correlation 700 in accordance with embodiments of the disclosed technology.

At 702, a user can create a list of contributors to be evaluated and send the list to a content manager, which can receive the list as input. For example, the user may list two contributors that the user suspects may be the same person. In alternative embodiments, the user may specify a single contributor that the user suspects may have changed to a different person within a certain time period.

At 704, the content manager can retrieve one or more attributions (e.g., attributions 108 of FIG. 1) for each of the contributors in the provided list. The content manager may have a limit on the number of attributions to retrieve based on user specifications or resource limitations, for example.

At 706, communities are mined (e.g., using a content manager) for content pertaining to the retrieved attributions and/or contributor information. The mining can involve the use of one or more search engines that can include commonly available search engines such as Google, for example.

At 708, results of the mining can be stored as persistent content. The persistent content can be updated or modified after each mining, for example. The persistent content can correspond to one or more of the contributors to be evaluated.

At 710, a semantic analysis and correlation can be performed (e.g., using a semantic correlation module) on some or all of the persistent content in light of the pertinent attributions. A semantic correlation module can access or receive some or all of the persistent content as input, for example. Performing the semantic analysis and correlation can include generating semantic abstracts for some or all of the persistent content (and also, in certain embodiments, the pertinent attributions).

At 712, results of the semantic analysis and correlation can be generated. Such correlation results can be provided as output. In certain embodiments, a dashboard can be used to graphically display some or all of the correlation results.

General Description of a Suitable Machine in Which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An attribution analysis and correlation system, comprising:
   a machine having a display;
   a content manager operable to receive a list comprising an identification of at least one contributor to be evaluated and to mine at least one community for content pertaining to the at least one contributor to be evaluated;
   a data store of the machine operable to store the mined content as persistent content;
   a semantic correlation module operable to generate correlation results by performing a semantic analysis and correlation on at least some of the persistent content; and
   a dashboard utility operable to graphically display on the display of the machine information pertaining to at least some of the correlation results, wherein the dashboard utility comprises a correlation meter and a plurality of status arrows that indicate a measure of similarity between two different attributions.

2. The attribution analysis and correlation system of claim 1, wherein the content manager is also operable to retrieve at least one attribution corresponding to the at least one contributor.

3. The attribution analysis and correlation system of claim 2, wherein the semantic correlation module is operable to generate the correlation results by performing the semantic analysis and correlation on the at least some of the persistent content and on at least one of the at least one attribution.

4. The attribution analysis and correlation system of claim 1, wherein the semantic correlation module is operable to generate the correlation results based at least in part on a plurality of semantic abstracts, wherein the plurality of semantic abstracts are based at least in part on the persistent content.

5. The attribution analysis and correlation system of claim 2, wherein the semantic correlation module is operable to generate the correlation results based at least in part on a plurality of semantic abstracts, wherein the plurality of semantic abstracts are based at least in part on the persistent content and on the at least one attribution.

6. The attribution analysis and correlation system of claim 1, wherein the content manager is operable to mine the at least one community via interaction with at least one of a plurality of search engines.

7. The attribution analysis and correlation system of claim 1, further comprising a user interface operable to allow a user to generate the list.

8. The attribution analysis and correlation system of claim 2, further comprising a data store operable to store the at least one attribution.

9. The attribution analysis and correlation system of claim 1, further comprising a data store operable to store the generated correlation results.

10. A computer-implemented method, comprising:
    receiving a list of at least one contributor to be evaluated;
    mining at least one community for content pertaining to the at least one contributor;
    storing the mined content as persistent content;
    performing a semantic analysis and correlation on the persistent content to generate correlation results, wherein performing the semantic analysis comprises creating at least one semantic abstract corresponding to the persistent content, and wherein the at least one semantic abstract is based on a plurality of dominant vectors and a plurality of dominant phrase vectors;
    displaying information pertaining to the correlated results; and
    displaying a correlation meter and a plurality of status arrows that indicate a measure of similarity between two different attributions corresponding to the at least one contributor.

11. The computer-implemented method of claim 10, further comprising retrieving attributions corresponding to the at least one contributor to be evaluated.

12. The computer-implemented method of claim 11, wherein the semantic analysis and correlation is also performed on the attributions.

13. The computer-implemented method of claim 10, further comprising storing intermediate results of the semantic analysis and correlation.

14. The computer-implemented method of claim 10, wherein the semantic analysis and correlation is based at least in part on previously generated correlation results.

15. The computer-implemented method of claim 10, wherein the at least one contributor comprises a plurality of contributors that a user suspects is the same person.

16. The computer-implemented method of claim 10, wherein the at least one contributor comprises a single contributor, wherein a user suspects that authorship of the single contributor has changed at least once within a particular date range.

17. The computer-implemented method of claim 10, further comprising storing the correlated results.

* * * * *

UNITED STATES PATENT AND TRADEMARK OFFICE
CERTIFICATE OF CORRECTION

PATENT NO. : 8,386,475 B2
APPLICATION NO. : 12/346665
DATED : February 26, 2013
INVENTOR(S) : Tammy Green et al.

It is certified that error appears in the above-identified patent and that said Letters Patent is hereby corrected as shown below:

In the Specification:
Column 1, line 47, "which is filly incorporated" should be replaced with --which is fully incorporated--.

Signed and Sealed this
Thirteenth Day of August, 2013

Teresa Stanek Rea
*Acting Director of the United States Patent and Trademark Office*